US011332966B2

(12) United States Patent
Börjesson et al.

(10) Patent No.: US 11,332,966 B2
(45) Date of Patent: May 17, 2022

(54) ADJUSTABLE HINGE ASSEMBLY FOR AUTOMOBILE TAILGATE

(71) Applicant: Volvo Car Corporation, Gothenburg (SE)

(72) Inventors: Hanna Börjesson, Gothenburg (SE); Johan Prim, Sätila (SE); Tobias Åberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 77 days.

(21) Appl. No.: 16/788,491

(22) Filed: Feb. 12, 2020

(65) Prior Publication Data

US 2020/0284077 A1    Sep. 10, 2020

Related U.S. Application Data

(63) Continuation-in-part of application No. 16/296,912, filed on Mar. 8, 2019, now abandoned.

(51) Int. Cl.
*E05D 1/04*  (2006.01)
*E05D 7/00*  (2006.01)
(Continued)

(52) U.S. Cl.
CPC .............. *E05D 7/0009* (2013.01); *B60S 5/00* (2013.01); *B62D 65/06* (2013.01); *E05D 3/02* (2013.01);
(Continued)

(58) Field of Classification Search
CPC ....... E05D 7/04; E05D 7/0415; E05D 7/0027; E05D 7/0045; E05D 7/0009; E05D 3/02;
(Continued)

(56) References Cited

U.S. PATENT DOCUMENTS 4,305,614 A * 12/1981 Holka ...................... B60J 5/101
16/252
4,908,908 A *  3/1990 Mitsuoka ................ E05D 5/043
16/251
(Continued)

FOREIGN PATENT DOCUMENTS

DE    102004057965 A1    6/2006
DE    102005042190 A1    3/2007
(Continued)

*Primary Examiner* — Chuck Y Mah
(74) *Attorney, Agent, or Firm* — Clements Bernard Walker; Christopher L. Bernard (57) ABSTRACT

This disclosure relates to an adjustable hinge assembly for an automobile tailgate. The hinge assembly includes a first mounting plate configured for mounting to an automobile body, a first hinge member attached to the first mounting plate, a second mounting plate configured for mounting to a tailgate, and a second hinge member attached to the second mounting plate. The first and second hinge members are hingedly connected. Adjustment screws are positioned on the hinge assembly to adjust the position of the first hinge member on the first mounting plate in the x and y-directions. An adjustment screw is positioned on the hinge assembly to adjust the position of the second hinge member on the second mounting plate in the z-direction. This is accomplished with minimal effort and tooling.

20 Claims, 8 Drawing Sheets

(51) Int. Cl.
*B62D 65/06* (2006.01)
*B60S 5/00* (2006.01)
*E05D 5/04* (2006.01)
*E05D 3/02* (2006.01)
*B60J 5/10* (2006.01)
*B62D 33/027* (2006.01)

(52) U.S. Cl.
CPC ............... *E05D 5/043* (2013.01); *B60J 5/101* (2013.01); *B62D 33/027* (2013.01); *E05Y 2900/546* (2013.01)

(58) Field of Classification Search
CPC ....... E05D 5/02; E05D 5/0207; E05D 5/0215; E05D 5/0223; E05D 5/023; E05D 5/043; E05D 11/0054; E05D 2007/0036; E05D 2007/0469; E05D 2007/0492; E05Y 2600/10; E05Y 2600/502; E05Y 2900/132; E05Y 2900/148; E05Y 2900/532; E05Y 2900/546; E05Y 2600/12; E05Y 2600/31; E05Y 2600/51; E05Y 2600/526; E05Y 2600/54; E05Y 2600/61; E05Y 2600/622; Y10T 16/554; Y10T 16/534; Y10T 16/5358; Y10T 16/5321; Y10T 16/5322; Y10T 16/53225; Y10T 16/53235; Y10T 16/53247; Y10T 16/53253; E06B 2009/007; B62D 65/06
See application file for complete search history.

(56) References Cited

U.S. PATENT DOCUMENTS

| | | | |
|---|---|---|---|
| 5,339,493 A | 8/1994 | Macintyre | |
| 5,419,012 A | 5/1995 | Lewis | |
| 5,500,983 A * | 3/1996 | Lautenschlager | E05D 7/04 16/292 |
| 6,141,830 A | 11/2000 | Shimooka | |
| 6,382,704 B1 | 5/2002 | Nastasoiu | |
| 6,666,497 B2 * | 12/2003 | Ohba | E05D 5/0207 16/261 |
| 8,511,768 B2 | 8/2013 | Brachert | |
| 8,555,464 B2 * | 10/2013 | Bannon | E05D 7/0415 16/237 |
| 8,826,857 B2 | 9/2014 | Sexton | |
| 9,605,457 B2 | 3/2017 | Humble | |
| 10,330,370 B2 | 6/2019 | Choi et al. | |
| 10,689,891 B2 | 6/2020 | Black | |
| 2002/0073509 A1 | 6/2002 | Dean | |
| 2012/0102674 A1 | 5/2012 | King | |
| 2012/0272479 A1 | 11/2012 | Rasel et al. | |
| 2017/0146282 A1 | 5/2017 | Dodge | |
| 2017/0174352 A1 | 6/2017 | Gonzalez Prieto | |
| 2019/0277073 A1 | 9/2019 | Kelly | |

FOREIGN PATENT DOCUMENTS

| | | | |
|---|---|---|---|
| EP | 2304145 B1 | 4/2012 | |
| GB | 2397099 A * | 7/2004 | ............ E05D 5/062 |
| KR | 100832180 B1 | 5/2008 | |

* cited by examiner

ADJUSTABLE HINGE ASSEMBLY FOR AUTOMOBILE TAILGATE

CROSS-REFERENCE TO RELATED APPLICATION

The present disclosure is a continuation-in-part (CIP) and claims the benefit of priority of co-pending U.S. patent application Ser. No. 16/296,912, filed on Mar. 8, 2019, and entitled "ADJUSTABLE HINGE ASSEMBLY FOR AUTOMOBILE TAILGATE," the contents of which are incorporated in full by reference herein.

TECHNICAL FIELD

This disclosure relates to an adjustable hinge assembly for an automobile tailgate. In particular, the hinge assembly incorporates adjustment screws for adjusting the position of the tailgate relative to the automobile body after installation of the tailgate to the automobile body.

BACKGROUND

Automobile tailgates are used to close the rear opening of an automobile. Typically, the tailgate is mounted to the automobile body by a hinge that allows the tailgate to open or close by rotating or pivoting on the hinge. The hinge usually contains a folding mechanism having a first bracket attached to the automobile body and a second bracket attached to the tailgate. The tailgate may be opened or closed by the action of the hinge, in either a manual or powered setup.

During assembly and/or operation of the automobile, the hinge and/or the tailgate may become misaligned, which leads to poor positioning, poor sealing, and poor gap and flush control of the tailgate. Current hinge designs require complicated and time consuming steps, such as loosening of the hinge from the automobile body and/or the tailgate, often requiring multiple tools, to adjust and realign the hinge for proper alignment of the tailgate with respect to the automobile body. The loosening of the hinge leads to uncontrolled and unwieldy handling of the tailgate.

Accordingly, there is a need for a hinge assembly that allows for simple, quick, and controlled adjustment of the tailgate hinge, with a minimum of tooling.

SUMMARY

An aspect of the present disclosure provides an adjustable hinge assembly for an automobile tailgate. The hinge assembly includes a first mounting plate configured for mounting to an automobile body, a first hinge member attached to the first mounting plate, a second mounting plate configured for mounting to a tailgate, and a second hinge member attached to the second mounting plate. The first and second hinge members are hingedly connected together. Adjustment screws are positioned on the hinge assembly to adjust the position of the first hinge member on the first mounting plate in the x and y-directions. An adjustment screw is positioned on the hinge assembly to adjust the position of the second hinge member on the second mounting plate in the z-direction. When assembled and in a closed configuration (a configuration of the hinge to keep the tailgate closed), the x, y, and z-directions are approximately orthogonal to each other. By being able to adjust the positions of the first and second hinge members on their respective mounting plates, the position of the tailgate on the automobile body can be adjusted for proper fitting after installation.

Another aspect of the present disclosure provides an automobile where a tailgate is attached to the automobile body by at least one of the adjustable hinge assemblies described above.

Methods for making and using the different aspects of the present disclosure are also provided.

Other aspects of the disclosure, including apparatuses, devices, kits, processes, and the like which constitute part of the disclosure, will become more apparent upon reading the following description of exemplary embodiments.

BRIEF DESCRIPTION OF THE DRAWINGS

The foregoing background and summary, as well as the following description of exemplary embodiments, will be better understood when read in conjunction with the appended drawings. For the purpose of illustrating the disclosure, there is shown in the drawings embodiments which are presently preferred. It should be understood, however, that the disclosure is not limited to the precise arrangements and instrumentalities shown. In the drawings.

DESCRIPTION OF EXEMPLARY EMBODIMENTS

The exemplary embodiments of the present disclosure will now be described with the reference to the accompanying drawings. The following description of the preferred embodiments is merely exemplary in nature and is in no way intended to limit the disclosure, its application, or uses.

For purposes of the following description, certain terminology is used for convenience only and is not limiting. The characterizations of various components and orientations described herein as being "front," "back," "vertical," "horizontal," "upright," "right," 'left," "side," "top," "bottom," "above," "below," or the like designate directions in the drawings to which reference is made and are relative characterizations only based upon the particular position or orientation of a given component, as illustrated. These terms shall not be regarded as limiting the invention. The words "downward" and "upward" refer to position in a vertical direction relative to a geometric center of the apparatus of the present invention and designated parts thereof. The terminology includes the words above specifically mentioned, derivatives thereof, and words of similar import.

Figure 1:
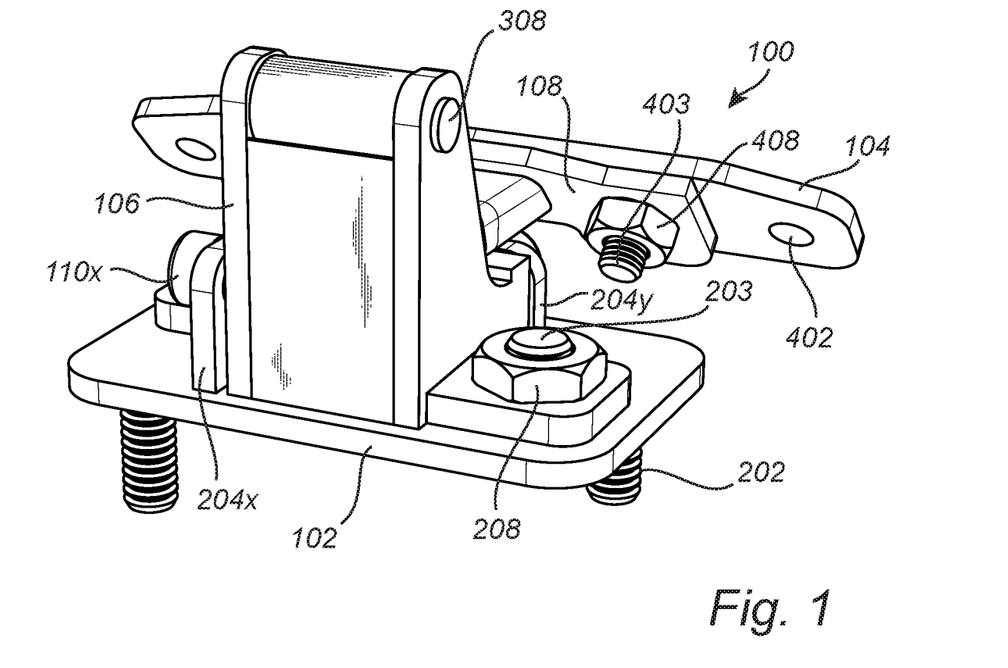
FIG. 1 is a drawing showing a first perspective view of a hinge assembly according to the present disclosure.
Figure 2:
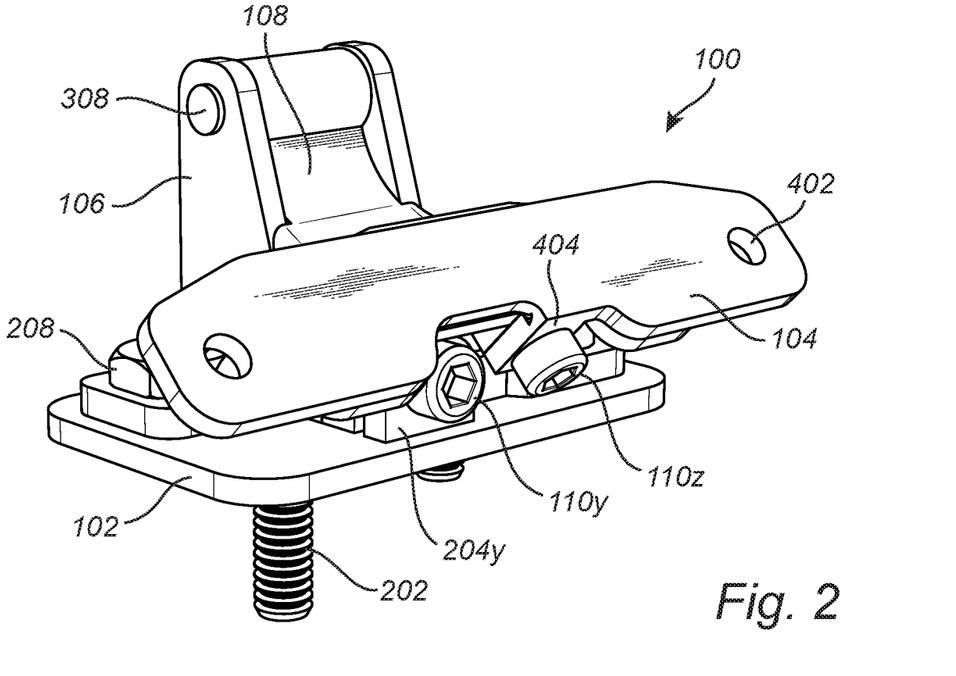
FIG. 2 is a drawing showing a second perspective view of the hinge assembly.
Figure 3:
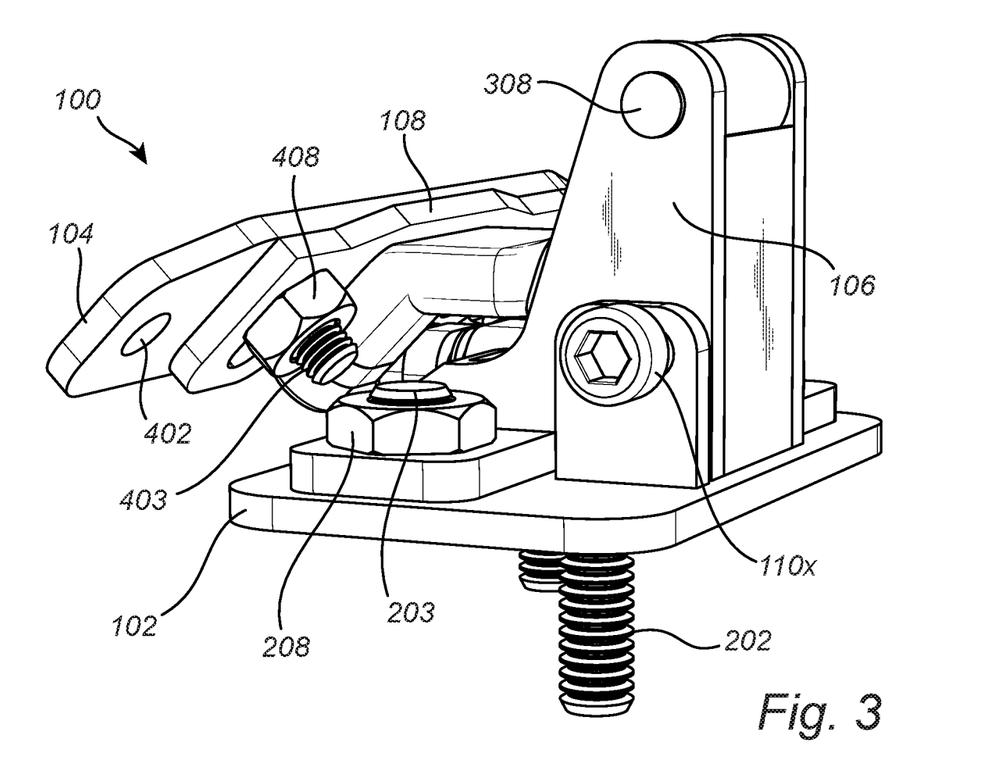
FIG. 3 is a drawing showing a third perspective view of the hinge assembly.

Referring now specifically to FIGS. 1-3, the hinge assembly 100 is designed and configured to be easily adjustable after the mounting of a tailgate to an automobile body using the hinge assembly 100. The hinge assembly 100 includes a first mounting plate 102, a second mounting plate 104, a first hinge member 106, and a second hinge member 108. The first mounting plate 102 is configured to mount to the automobile body; and the second mounting plate 104 is configured to mount to the tailgate. That said, one skilled in the art would understand that it is possible to reverse the hinge assembly 100 so that the first mounting plate 102 and the first hinge member 106 are mounted to the tailgate, and the second mounting plate 103 and the second hinge member 108 are mounted to the automobile body. The first hinge member 106 is mounted on the first mounting plate 102. As discussed in further detail below, the mounting of the first hinge member 106 on the first mounting plate 102 can be adjustable in a first direction x (the x-direction) and a second direction y (the y-direction), where the first and second directions are approximately orthogonal to each other and are substantially parallel to the plane of the first mounting plate 102. The second hinge member 108 is mounted on the second mounting plate 104. As discussed in further detail below, the mounting of the second hinge member 108 on the second mounting plate 104 can be adjustable in a third direction z (the z-direction) substantially parallel to the plane of the second mounting plate 104. The first and second hinge members 106 and 108 are hingedly connected to provide a hinge therebetween. In the closed configuration of the hinge assembly 100, the x, y, and z-directions are thus approximately orthogonal to each other, although this relationship may change when the hinge assembly 100 is in an open configuration.

Figure 4:
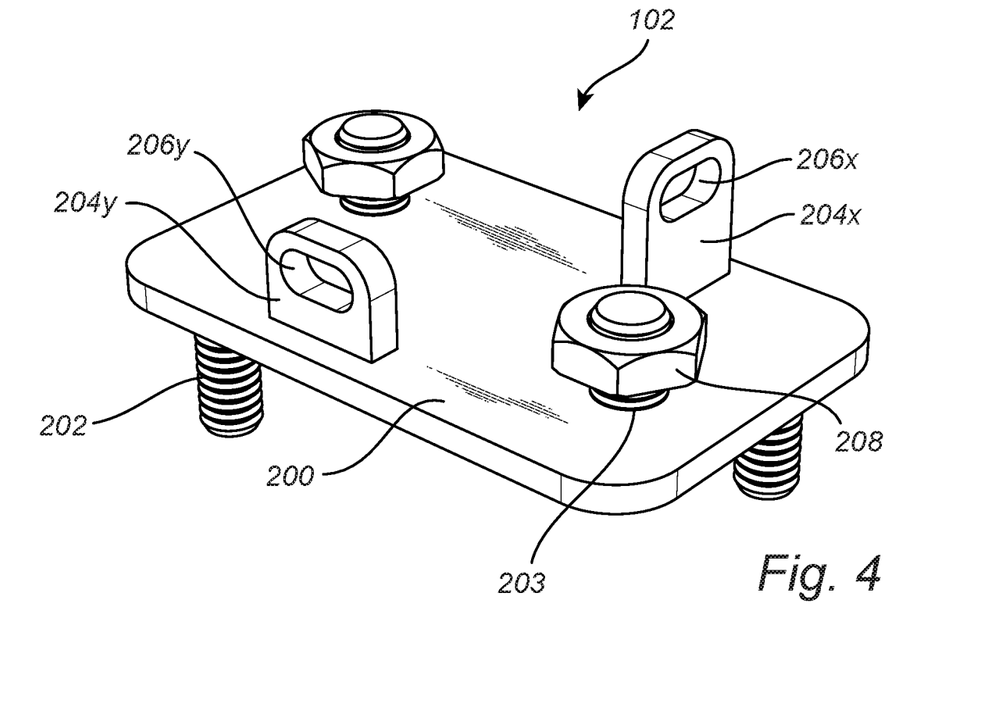
FIG. 4 is a drawing showing a perspective view of the first mounting plate.
Figure 5:
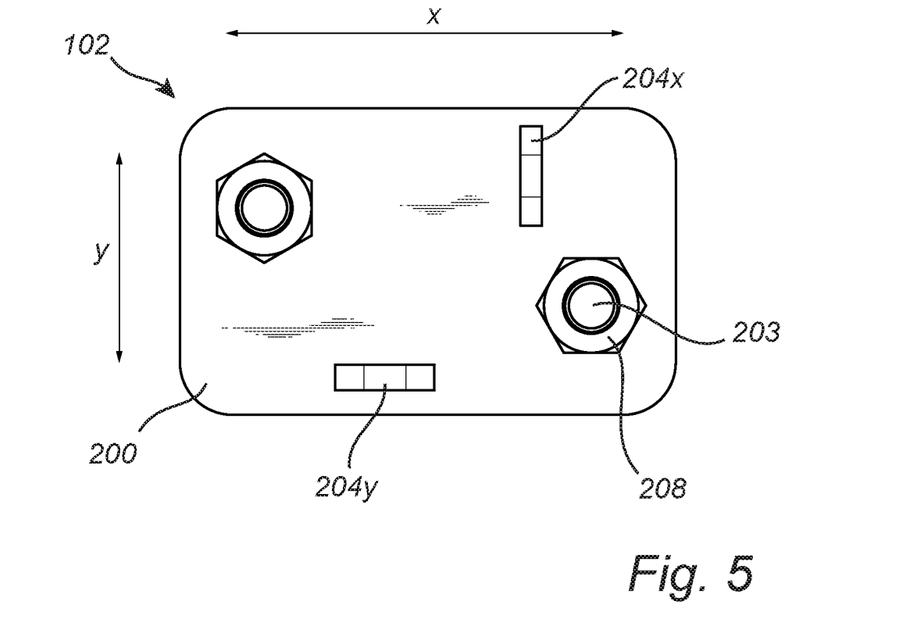
FIG. 5 is a drawing showing a plan view of the first mounting plate.
Figure 10:
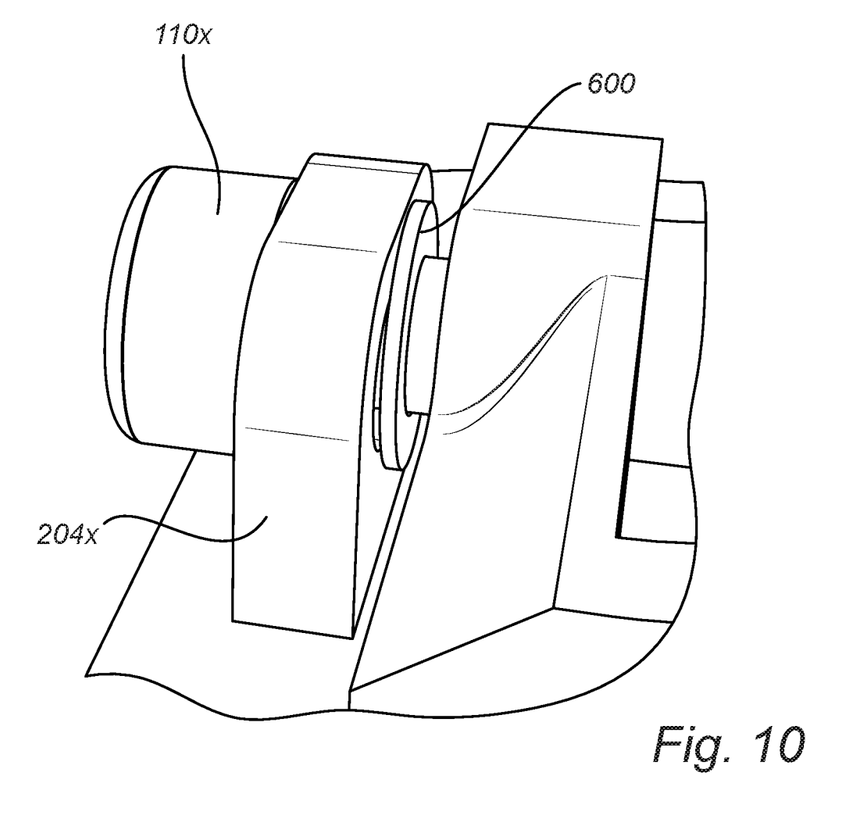
FIG. 10 is a drawing showing a close up view of an assembled adjustment screw.

Referring to FIGS. 4 and 5, the first mounting plate 102 includes a substantially flat, planar body 200 configured to be mounted substantially flush against the automobile body. The mounting of the first mounting plate 102 to the automobile body may be by adhesive, welding, and/or fasteners (e.g., screws, nuts/bolts, rivets, etc.). In certain embodiments, at least two fasteners 202 (FIG. 4) are used to mount the first mounting plate 102 to the automobile body. The fasteners 202 may be welded to the mounting plate 102 and configured to mount the mounting plate 102 to the automobile body in a predetermined orientation. The planar body 200 includes mounting posts 203 extending perpendicularly from the plane of the planar body 200 opposite the fasteners 202 for mounting of the first hinge member 106 (FIGS. 1-3) thereon (as noted below, these mounting posts 203 may be replaced by bolts). The mounting posts 203 may be threaded to accept nuts 208 for holding the first hinge member 106 securely against the planar body 200. Additionally, the planar body 200 includes adjustment tabs 204x and 204y extending perpendicularly from the planar body 200 in the same direction as the mounting posts 203. The first adjustment tab 204x contains an oval through opening 206x (FIG. 4) for passing of an adjustment screw 110x (FIG. 3) therethrough. The opening 206x has a center axis in the x-direction, and a major axis in the y-direction orthogonal to the x-direction (both the x and y-directions are parallel to the major plane of the planar body 200). The second adjustment tab 204y contains an oval through opening 206y (FIG. 4) for passing of an adjustment screw 110y (FIG. 2) therethrough. The opening 206y has a center axis in the y-direction, and a major axis in the x-direction. The head of each the adjustment screws 110x and 110y is retained adjacent to its respective adjustment tab 204x or 204y, so that the head cannot back away from the adjustment tab 204x or 204y. In a preferred embodiment, as shown in FIG. 10, a lock ring 600 is used to retain the head of the adjustment screw 110x against the adjustment tab 204x. The lock ring 600 clips to the shaft of the adjustment screw 110x on the side of the adjustment tab 204x, such that the head of the adjustment screw 110x and the locking ring 600 are on opposing sides of the adjustment tab 204x. That way, the locking ring 600 prevents the head of the adjustment screw 110x from backing away from the adjustment tab 204x. A similar locking ring may also be used for the other adjustment screws 110y and 110z (FIG. 2 and described below).

Figure 6:
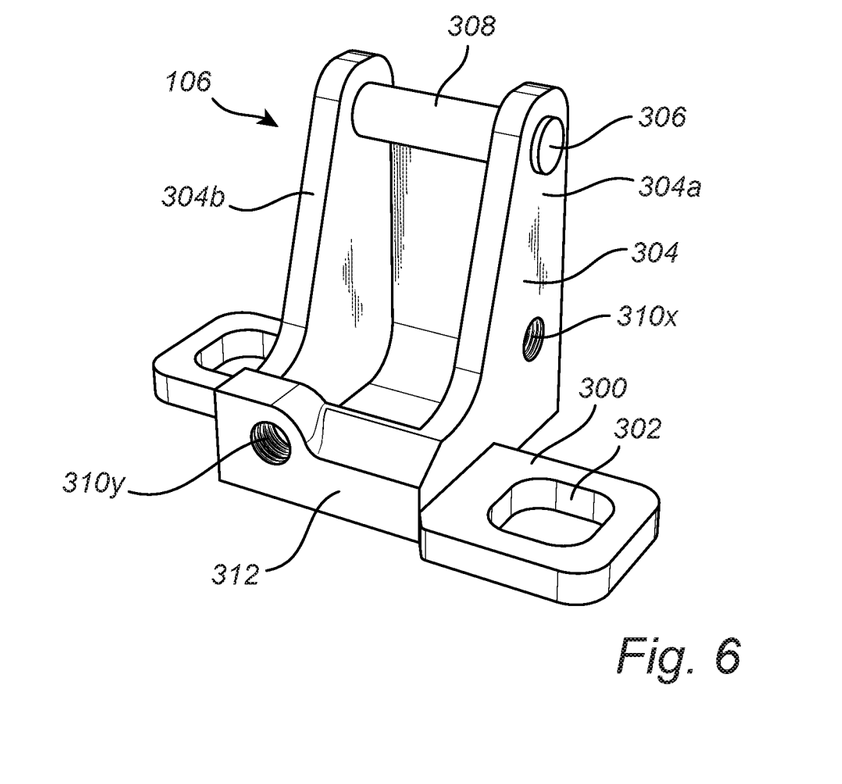
FIG. 6 is a drawing showing a perspective view of the first hinge member.

Referring to FIG. 6, the first hinge member 106 includes a base 300 and a hinge arm 304. The base 300 is configured to be mounted adjacent to and substantially in contact with the first mounting plate 102 (FIGS. 1-5). The base 300 contains holes 302 that are in registry and aligned with the mounting posts 203 (FIGS. 1 and 3-5) on the first mounting plate 102, so that the mounting posts 203 can pass therethrough when the base 300 is placed substantially against the first mounting plate 102. Nuts 208 (FIGS. 1-5) are then used to secure the first hinge member 106 to the first mounting plate 102. It is important that the holes 302 are slightly larger than the mounting posts 203, so that adjustments in relative positioning can be made as described below. In certain embodiments, the diameter of the holes 302 are about 4 to about 8 mm, or about 5 mm to about 8 mm larger than the diameter of the mounting posts 203. The diameter of the holes 302 depends on the adjustability designed into the first hinge member 106. For example, if the adjustability is ±2.5 mm, then the holes 302 are about 5 mm larger than the mounting posts 203. Likewise, for an adjustability of ±4 mm, then the diameter of the holes 302 are about 8 mm larger than the diameter of the mounting posts 203. The first hinge member 106 also contains a hinge arm 304 extending perpendicularly from the base 300. The hinge arm 304 may contain two arm members 304a and 304b, as illustrated in the drawings, but may also be effectively designed with a single arm member. The distal end of the hinge arm 304 (the end farthest away from the base 300) defines a hole 306 configured to accept a shaft 308 therethrough, or includes an integral shaft 308. The shaft 308 is configured to hingedly connect the first hinge member 106 to the second hinge member 108 (FIGS. 1-3) (as described below). The hinge arm 304 includes a threaded hole 310x that is in registry and aligned with the opening 206x (FIG. 4) on the first mounting plate 102 when the first hinge member 106 is properly positioned on the first mounting plate 102. The first hinge member 106 also contains a wall 312 rising perpendicularly from the base 300 and facing a direction perpendicular to the hinge arm 304. The wall 312 contains a threaded hole 310y that is in registry and aligned with the opening 206y (FIG. 4) on the first mounting plate 102.

To attach the first hinge member 106 to the first mounting plate 102, the base 300 of the first hinge member 106 is positioned against the planar body 200 of the first mounting plate 102, such that the mounting posts 203 of the first hinge member 106 pass through the holes 302 (see FIGS. 1-3). The nuts 208 are then used to secure the first hinge member 106 to the first mounting plate 102 (see FIGS. 1 and 2). Although mounting posts 203 and nuts 208 are described and shown in the drawings, it may be possible to use bolts/nuts to attach the first hinge member 106 to the first mounting plate 102. In that case, holes are located in the planar body 200 where the mounting posts 203 are shown. Bolts are then placed through the holes to substitute for the mounting posts 203. When the bolts/nuts are used, appropriate water tight gaskets should be used to prevent water seepage. Adjustment screw 110$x$ is then placed through opening 206$x$ and threadedly engaged to hole 310$x$ (i.e., screwed into hole 210$x$) (see FIG. 3). Adjustment screw 110$y$ is then placed through opening 206$y$ and threadedly engaged to hole 310$y$ (see FIG. 2). The adjustment screws 110$x$ and 110$y$ are used to make adjustments to the position of the first hinge member 106 relative to the first mounting plate 102 in approximately the x and y-directions, respectively. Because the heads of the adjustment screws 110$x$ and 110$y$ are retained against their respective adjustment tabs 204$x$ and 204$y$, e.g. by the locking ring 600, the turning of the screws 110$x$ and 110$y$ moves only the first hinge member 106 relative to the first mounting plate 102, when the nuts 208 are loosened (and subsequently re-tightened).

Figure 7:
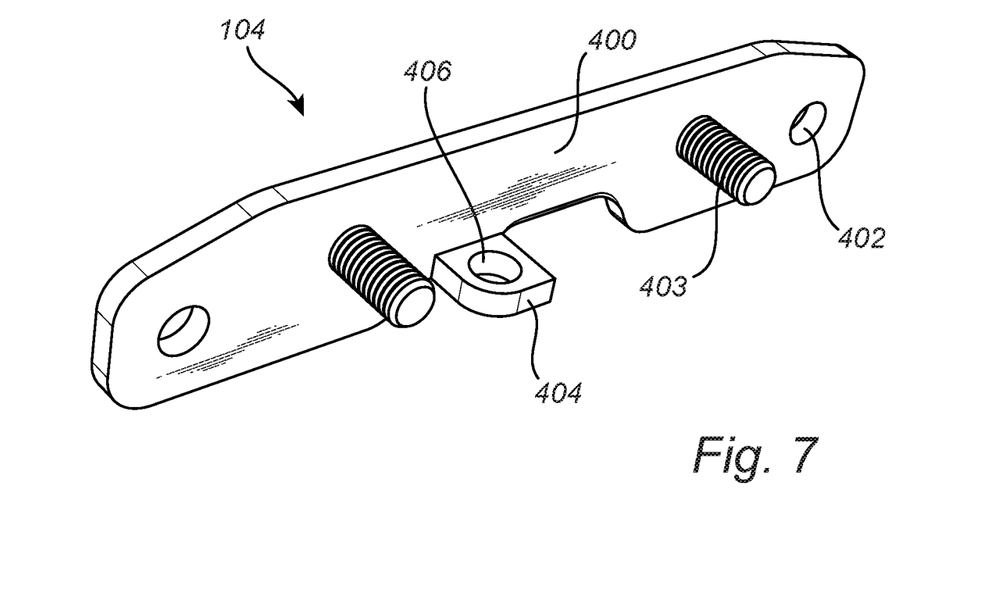
FIG. 7 is a drawing showing a perspective view of the second mounting plate.
Figure 8:
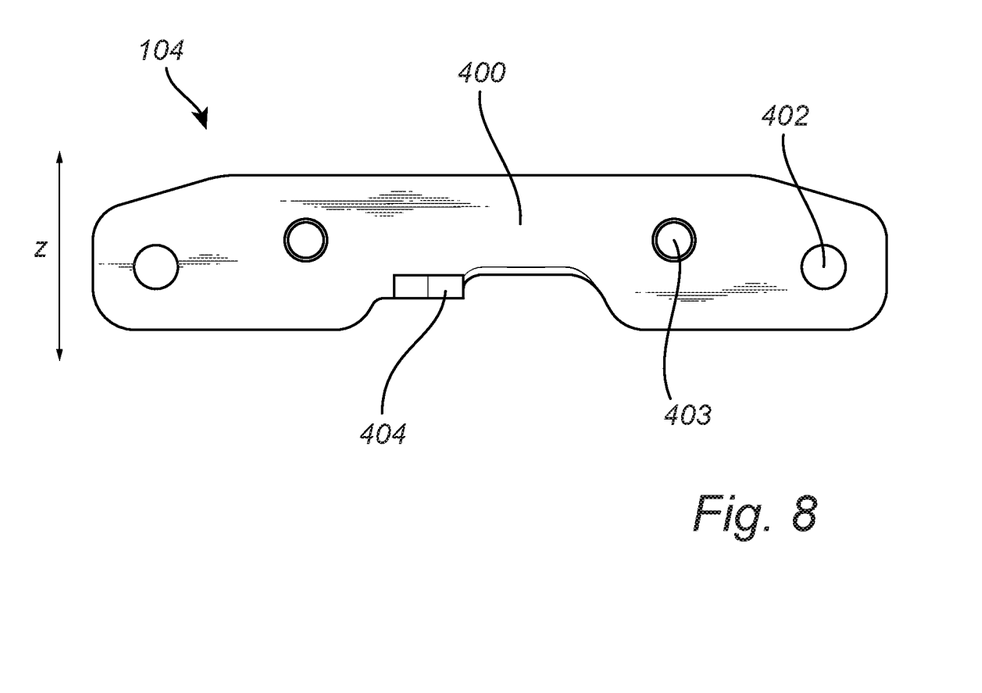
FIG. 8 is a drawing showing a plan view of the second mounting plate.

Referring to FIGS. 7 and 8, the second mounting plate 104 includes a substantially flat, planar body 400 configured to be mounted flush against the tailgate. The mounting of the second mounting plate 104 to the tailgate may be by adhesive, welding, and/or fasteners (e.g., screws, nuts/bolts, rivets, etc.). In certain embodiments, at least two fasteners are used to mount the second mounting plate 104 to the tailgate. The fasteners are placed through holes 402 to mount the second mounting plate 104 to the tailgate. The planar body 400 contains one or more threaded mounting posts 403 for constrained mounting of the second hinge member 108 (FIGS. 1-3) to the second mounting plate 104 (as noted below, the mounting posts 403 may be replaced with bolts/nuts similar to those disclosed above for the first mounting plate 102). The planar body 400 further includes an adjustment tab 404 extending perpendicularly from the planar body 400. The adjustment tab 404 defines an opening 406 (FIG. 7) for the passing of an adjustment screw 110$z$ (FIG. 2) therethrough. The opening 406 has a center axis approximately in the z-direction (see FIG. 8). Like adjustment screws 110$x$ and 110$y$, the adjustment screw 110$z$ is also retained on its respective adjustment tab 404, e.g., by a lock ring 600 (FIG. 10), and prevented from backing therefrom.

Figure 9:
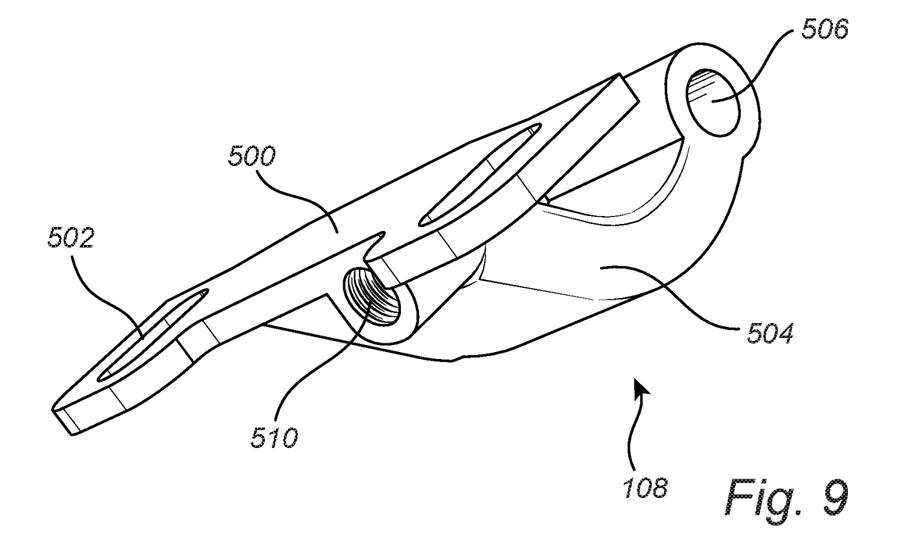
FIG. 9 is a drawing showing a perspective view of the second hinge member.

Referring to FIG. 9, the second hinge member 108 includes a base 500 and a hinge arm 504. The base 500 is configured to be mounted adjacent to and substantially in contact with the second mounting plate 104 (FIGS. 1-3, 7, and 8). The base 500 defines holes 502 that are in registry and aligned with the mounting posts 403 (FIGS. 7 and 8) on the second mounting plate 104, so that the mounting posts 403 can pass therethrough when the base 500 is placed against the second mounting plate 104. Nuts 408 (FIGS. 1 and 3) threadedly engaging the mounting posts 403 can be used to secure the second hinge member 108 to the second mounting plate 104. It is important that the holes 502 are slightly larger than the bolts, so that fine adjustments can be made as described below. The difference between the size of the holes 502 and the size of the mounting posts 403 depends on the desired adjustability of the second hinge member 108, similar to that discussed above for the first hinge member 106. The second hinge member 108 also contains a hinge arm 504 extending away from the base 500. The distal end of the hinge arm 504 (the end farthest away from the base 500) defines a hole 506 configured to accept the shaft 308 (FIGS. 1-3 and 6) of the first hinge member 106 therethrough. The shaft 308 is configured to hingedly connect the second hinge member 108 to the first hinge member 106 (as described below). The proximal end of the hinge arm 504 (the end adjacent to the base 500) contains a threaded hole 510 that is in registry and aligned with the opening 406 (FIG. 7) on the second mounting plate 104, when the second hinge member 108 is properly positioned on the second mounting plate 104. In an embodiment, the hinge arm 504 may form a curve, e.g. a quarter circular curve, as it extends away from the base 500. The hinge arm 504, however, may be of different shapes as long as it does not interfere with the opening or closing of the tailgate.

To attach the second hinge member 108 to the second mounting plate 104, the base 500 of the second hinge member 108 is positioned substantially against the planar body 400 of the second mounting plate 104, such that the holes 502 of the second hinge member 108 align with the mounting posts 403 of the second mounting plate 104 (see FIG. 3). Threaded engagement of the nuts 408 with the mounting posts 403 is then used to secure the second hinge member 108 to the second mounting plate 104 (see FIG. 3). Although nuts 408 and mounting posts 403 are described and shown in the drawings, it may be possible to use bolts/nuts to attach the second hinge member 108 to the second mounting plate 104. In that case, holes are located in the planar body 400 where the mounting posts 403 are shown. Bolts are then placed through the holes to substitute for the mounting posts 403. When the bolts/nuts are used, appropriate water tight gaskets should be used to prevent water seepage. The adjustment screw 110$z$ (FIG. 2) is then placed through the opening 406 and threadedly engaged to hole 510 on the second hinge member 108 (see FIG. 2). The adjustment screws 110$z$ can be used to make adjustments to the position of the second hinge member 108 in approximately the z-direction. Because the adjustment screw 110$z$ is prevented from backing away for its respective adjustment tab 404, e.g. by the locking ring 600, the turning of the adjustment screw 110$z$ moves the second hinge member 108 relative to the second mounting plate 104, when the nuts 408 are loosened.

To complete the hinge assembly 100, the distal ends of the first and second hinge members 106 and 108 are hingedly connected by the shaft 308. The shaft 308 is placed through the hole (or hook) 306 of the first hinge member 106 and the hole 506 of the second hinge member 108. The holes 306 and 506 are sufficiently sized to allow the first and second hinge members 106 and 108 to rotate or pivot around the shaft 308, thereby allowing for hinging movement between the first and second hinge members 106 and 108. When the hinge assembly 100 is in the closed position, the x, y, and z-directions are approximately orthogonal to each other.

The parts of the hinge assembly 100 may be made from metals and/or polymeric materials. For example, the hinge assembly 100 is made from steel and/or aluminum. The parts of the hinge assembly 100 may be made using techniques known in the art, such as, but not limited to, forging, molding, machining, laser shaping, stereo lithography, sintering, additive manufacturing (i.e., 3-D printing), or combinations thereof.

The hinge assembly 100 is used to attach a tailgate to the body of an automobile. In certain embodiments, at least two hinge assemblies 100 are used to attach the tailgate. The first mounting plate 102 is attached directly to the body of the automobile, e.g. by fasteners 202; and the second mounting plate 104 is attached directly to the tailgate, e.g. by fasteners 402. Once the tailgate is roughly attached to the body of the automobile by the hinge assembly (or assemblies) 100, fine adjustment of the position of the tailgate may be accomplished through the adjustment screws 110x, 110y, and 110z. The adjustment screws 110x, 110y, and 110z are retained on their respective adjustment tabs 204x, 204y, and 404, such that the screws are allowed to rotate around their center axes, but do not substantially move in the direction of the center axes and cannot back away from their respective adjustment tabs 204x, 204y, and 404. To make the adjustments, the nuts 208 (holding the first hinge member 106 to the first mounting plate 102) and 408 (holding the second hinge member 108 to the second mounting plate 104) are loosened. The loosened nuts 208 and 408 allow the hinge members 106 and 108 to "float" on their respective mounting plates 102 and 104. The adjustment screws 110x, 110y, and 110z are then used to adjust the position of the hinge members 106 and 108 in approximately the x, y, and z-directions, respectively; thereby, adjusting the position of the tailgate relative to the automobile body. Depending on the desired adjustment, each of adjustment screws 110x, 110y, and 110z may be turned to advance into its respective threaded hole 310x, 310y, or 510, respectively, or may be turned to back out (though not completely) of its respective threaded hole 310x, 310y, or 510. Because the screws 110x, 110y, and 110z are retained on their respective adjustment tabs 204x, 204y, and 404, as described above, the rotation of the screw 110x or 110y moves the first hinge member 106 toward or away from the respective adjustment tabs 204x or 204y, and the rotation of the screw 110z moves the second hinge member 108 toward or away from the respective adjustment tab 404.

The hinge assembly 100 may be engineered and used for attaching any tailgate to any automobile. The tailgate may typically be used on a station wagon, a sport utility vehicle (SUV), or a truck, for example. The tailgate may be opened by (manually or automatically) lifting the bottom of the tailgate away from the automobile body.

Figure 11:
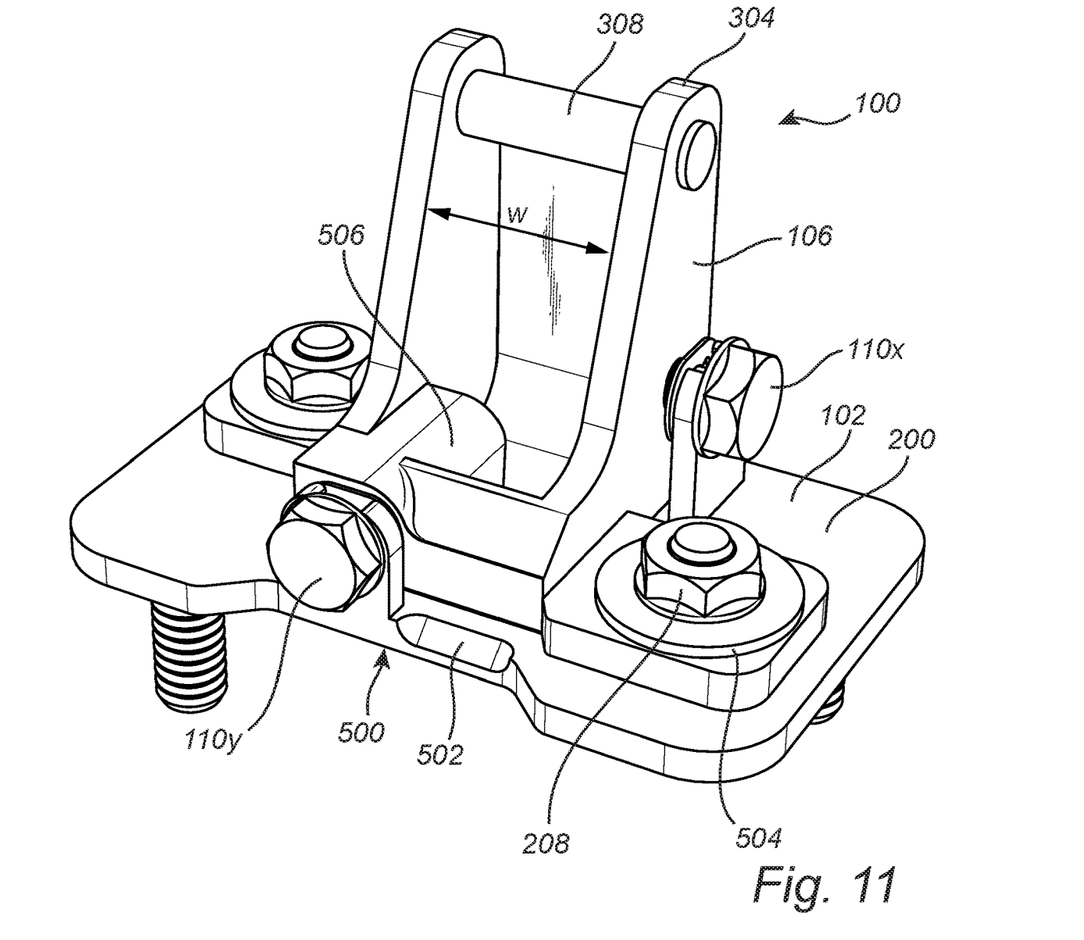
FIG. 11 is a drawing showing a perspective view of a first mounting plate and a first hinge member of another hinge assembly according to the present disclosure.

Referring to FIG. 11, a portion of another hinge assembly 100 is illustrated, incorporating minor modifications to the hinge assembly 100 described above. Here, the hinge assembly 100, and specifically the first mounting plate 102 and the first hinge member 106 utilize a hinge arm 304 that has increased width, w, as compared to the hinge arm 304 described above, as well as a shaft 308 that has increased longitudinal length, providing greater structural stability. The planar body 200 of the first mounting plate 102 includes a plurality of cutouts 500, 502 to better accommodate the screws and other structures of the second hinge member 108 (not illustrated) when the hinge assembly 100 is disposed in a closed configuration, for example. Further, all screws/bolts 208, 110x, and 110y associated with the first mounting plate 102 and first hinge member 106, as well as all screws/bolts 408 (not illustrated) associated with the second mounting plate 104 (not illustrated) and second hinge member 108, are of the same size, such that a common tool may be used to tighten/loosen or place/remove all, thereby promoting hinge installation/removal and adjustment ease and efficiency. For example, M6 heads can be used for all screws/bolts. Washers 504 are provided with all the bolts 208 used to secure the first hinge member 106 to the first mounting plate 102. Still further, the end of adjustment screw 110y is entirely encapsulated in an internally-threaded screw housing 506 manufactured into the body of the first hinge member 106 at the corresponding location.

Figure 12:
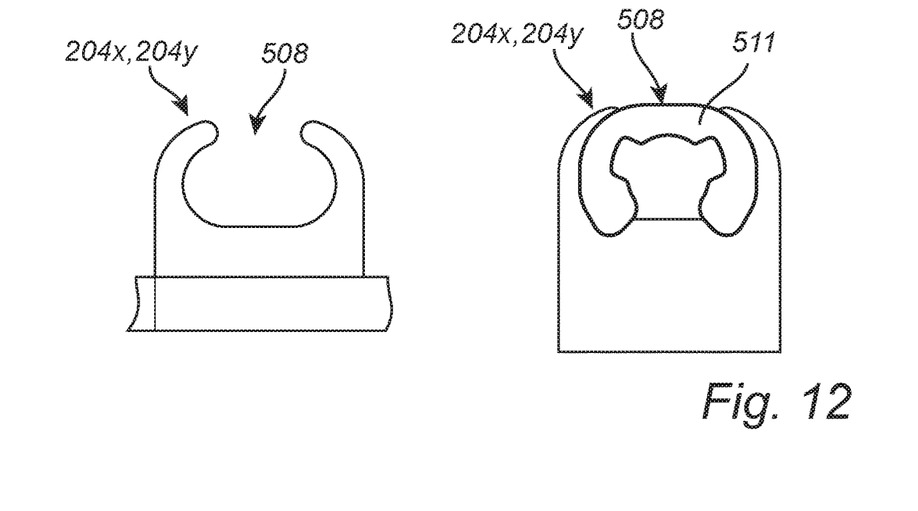
FIG. 12 is a drawing showing planar views of alternative adjustment tabs of the first hinge member, utilizing open apertures and hemispherical locking tabs to secure the associated adjustment screws.

Referring to FIGS. 11 and 12, all adjustment tabs 204x and 204y (FIG. 12) for holding the various adjustment screws 110x and 110y (FIG. 11) no longer utilize closed holes, but rather utilize open apertures 508 (FIG. 12) in which the adjustment screws 110x and 110y are selectively disposed and retained. Hemispherical lock rings 511 (FIG. 12) are now used to secure the adjustment screws 100x and 100y in the corresponding open apertures 508, promoting easy and efficient assembly/disassembly. Thus, the various adjustment screws 110x and 110y can now be threadedly engaged to the various holes 310x, 310y, and 510 before the hinge members 106 and 108 are secured to the mounting plates 102 and 104, which is more efficient.

Figure 13:
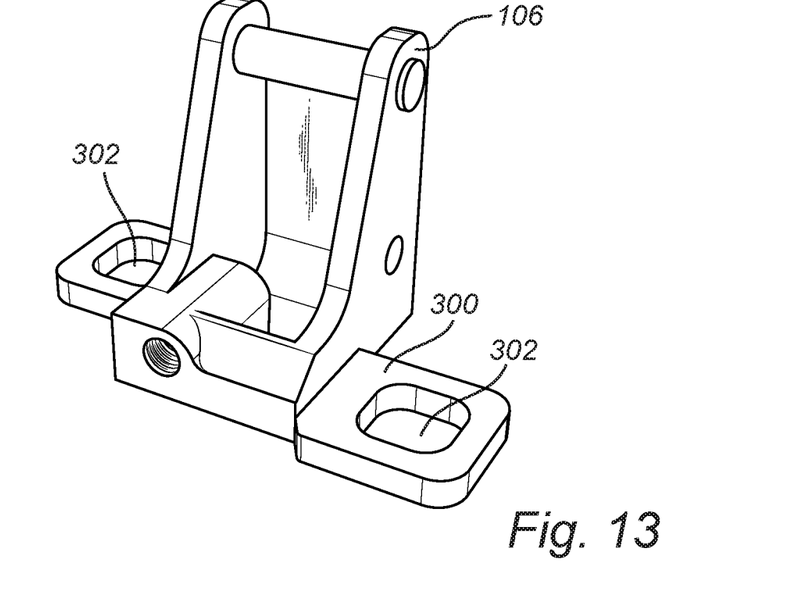
FIG. 13 is a drawing showing a perspective view of another first hinge member.

Referring to FIG. 13, the holes 302 formed in the base 300 of the first hinge member 106 may be formed as rounded squares or rectangles, as opposed to the circles provided above, to provide a full adjustment range of the first hinge member 106 with respect to the first mounting plate 102 (not illustrated) in the x and y-directions when the first hinge member 106 is coupled to the first mounting plate 102 before securement of the two components. Rectangles would of course enable increased adjustability in one direction over an orthogonal direction, if desired.

Figure 14:
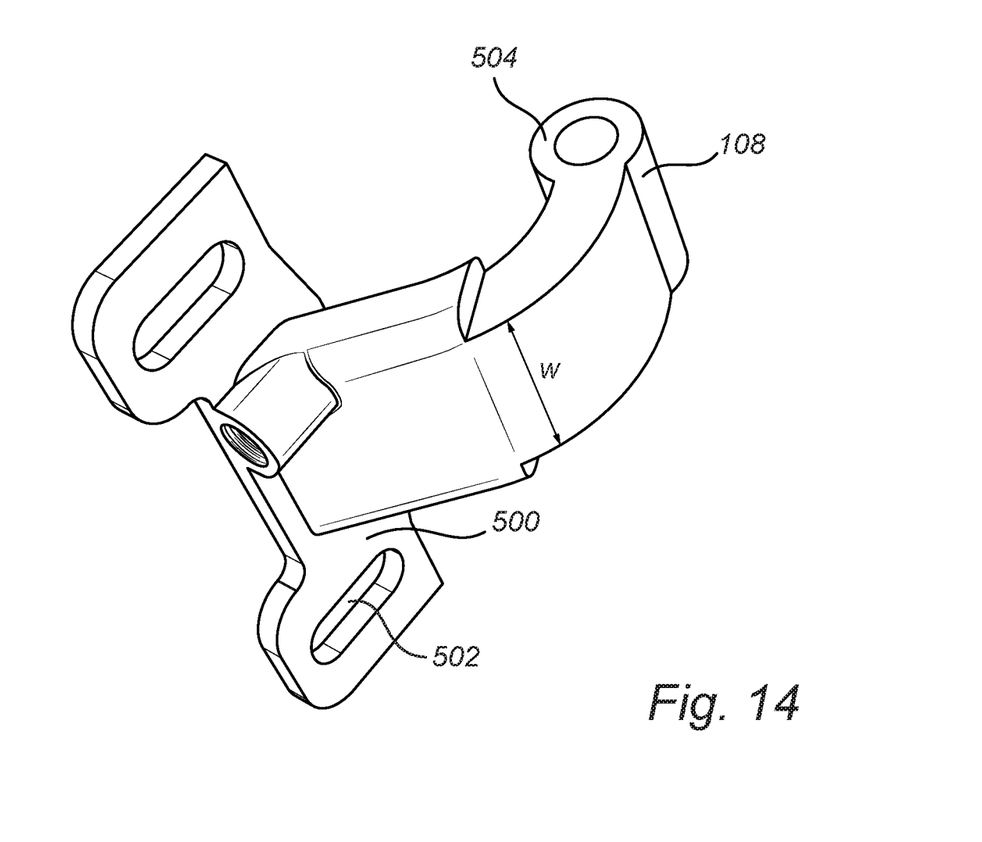
FIG. 14 is a drawing showing a perspective view of another second hinge member.

Referring to FIG. 14, the holes 502 formed in the base 500 of the second hinge member 108 may also be formed as rounded rectangles to provide a full adjustment range of the second hinge member 108 with respect to the second mounting plate 104 (not illustrated) in the z-direction when the second hinge member 108 is coupled to the second mounting plate 104 before securement of the two components. Further, the second hinge member 108 may utilize a hinge arm 504 that has increased width, w, as compared to the hinge arm 504 described above. This corresponds to the widened hinge arm 304 (not illustrated) of the first hinge member 106 (not illustrated).

Figure 15:
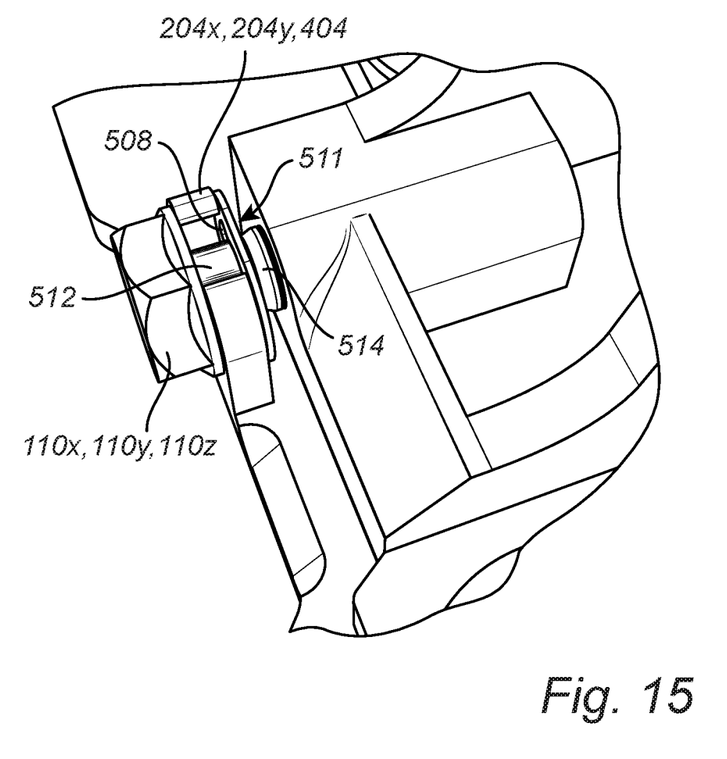
FIG. 15 is a drawing showing a perspective view of the alternative adjustment tabs and screws of the first hinge member and the second hinge member.

Referring to FIG. 15, the various adjustment tabs 204x, 204y, and 404 of the first hinge member 104 (not illustrated) and the second hinge member 108 (not illustrated) may be dimensioned for structural integrity and stability and retain screws 110x, 110y, and 100z that include a smooth bore 512 corresponding to the open aperture 508 formed in the respective adjustment tab 204x, 204y, and 404, with this smooth bore accommodating the hemispherical lock ring 511 utilized as well. Here, the lock ring 511 abuts a shoulder 514 corresponding to the externally-threaded part of the associated adjustment screw 110x, 110y, and 110z. Again, this facilitates placement/removal of the adjustment screw 110x, 110y, and 110z in/from the associated aperture 508.

It should be noted above that the first mounting plate 102, the second mounting plate 104, the first hinge member 106, and the second hinge member 108 may all utilize appropriate reinforcements, cutouts/bevels and edge radii to provide the desired structural integrity, yet prevent interferences between the various components of the hinge assembly when the hinge assembly is disposed in a closed configuration, for example, as well as sharp edges and snap points. Further, the locations and spacings of the various screws can be selected to prevent such interferences. Again, the commonality of all screws is provided to promote installation/removal and adjustment ease and efficiency, with a minimum tooling requirement.

Although certain presently preferred embodiments of the disclosure have been specifically described herein, it will be apparent to those skilled in the art to which the disclosure pertains that variations and modifications of the various embodiments shown and described herein may be made without departing from the spirit and scope of the disclosure.

What is claimed is:

1. A hinge assembly, comprising:
a first mounting plate mounted to a body of an automobile;
a first hinge member attached to the first mounting plate;
a second mounting plate mounted to a tailgate of the automobile;
a second hinge member attached to the second mounting plate and hingedly connected to the first hinge member;
a first adjustment screw coupling the first hinge member to the first mounting plate and adapted to adjust the position of the first hinge member on the first mounting plate in the x-direction;
a second adjustment screw coupling the first hinge member to the first mounting plate and adapted to adjust the position of the first hinge member on the first mounting plate in the y-direction; and
a third adjustment screw coupling the second hinge member to the second mounting plate and adapted to adjust the position of the second hinge member on the second mounting plate in the z-direction,
wherein the x and y-directions are in a plane parallel to the first mounting plate, and the x, y, and z-directions are approximately orthogonal to each other when the hinge assembly is in a closed configuration.

2. The hinge assembly of claim 1, wherein the first mounting plate comprises:
a flat, planar body including a mounting means for the first hinge member,
a first adjustment tab extending perpendicularly away from the planar body and defining a first open aperture, the first open aperture having a center axis in the x-direction and a major axis in the y-direction, and
a second adjustment tab extending perpendicularly away from the planar body and defining a second open aperture, the second open aperture having a center axis in the y-direction and a major axis in the x-direction.

3. The hinge assembly of claim 2, wherein the first hinge member comprises a base mounted to the first mounting plate and a hinge arm extending perpendicularly from the base, the hinge arm defining a first threaded hole in alignment with the first open aperture, where the first adjustment screw passes through the first open aperture and thread engages the first threaded hole.

4. The hinge assembly of claim 3, wherein the first hinge member further comprises a wall extending perpendicularly from the base and defining a second threaded hole in alignment with the second open aperture, where the second adjustment screw passes through the second open aperture and thread engages the second threaded hole.

5. The hinge assembly of claim 3, wherein the distal end of the hinge arm defines a hole, where a shaft passing through the hole hingedly connects the first hinge member to the second hinge member.

6. The hinge assembly of claim 3, wherein the base of the first hinge member is mounted to the first mounting plate by one of bolts and mounting posts disposed on the first mounting plate and nuts.

7. The hinge assembly of claim 1, wherein the second mounting plate comprises:
a flat, planar body including a mounting means for the second hinge member, and
an adjustment tab extending perpendicularly away from the planar body and defining an open aperture, the open aperture having a center axis in the z-direction.

8. The hinge assembly of claim 7, wherein the second hinge member comprises a base mounted to the second mounting plate and a hinge arm extending perpendicularly from the base, the base defining a threaded adjustment hole in alignment with the open aperture of the second mounting plate, where the third adjustment screw passes through the open aperture of the second mounting plate and thread engages the threaded hole of the second hinge member.

9. The hinge assembly of claim 8, wherein the distal end of the hinge arm of the second hinge member defines a hole, where a shaft passing through the hole hingedly connects the second hinge member to the first hinge member.

10. The hinge assembly of claim 8, wherein the base of the second hinge member is mounted to the second mounting plate by one of bolts and mounting posts disposed on the first mounting plate and nuts.

11. The hinge assembly of claim 1, wherein the first mounting plate defines holes through which the first mounting plate is mounted to the body of the automobile.

12. The hinge assembly of claim 1, wherein the second mounting plate defines holes through which the second mounting plate is mounted to the tailgate of the automobile.

13. The hinge assembly of claim 1, wherein
the first mounting plate comprises:
a flat, planar body including a mounting means for the first hinge member,
a first adjustment tab extending perpendicularly away from the planar body and defining a first open aperture, where the first open aperture has a center axis in the x-direction and a major axis in the y-direction, and
a second adjustment tab extending perpendicularly away from the planar body and defining a second open aperture, where the second open aperture has a center axis in the y-direction and a major axis in the x-direction;
wherein the first hinge member comprises:
a first base mounted to the first mounting plate,
a first hinge arm extending perpendicularly from the base, the first hinge arm defining a first threaded hole in alignment with the first open aperture, where the first adjustment screw passes through the first open aperture and thread engages the first threaded hole, and
a wall extending perpendicularly from the base and defining a second threaded hole in alignment with the second open aperture, where the second adjustment screw passes through the second open aperture and thread engages the second threaded hole,
wherein the second mounting plate comprises:
a flat, planar body including a mounting means for the second hinge member, and
a third adjustment tab extending perpendicularly away from the planar body and defining a third open aperture, the third open aperture having a center axis in the z-direction,
wherein the second hinge member comprises:
a second base mounted to the second mounting plate, the second base defining a third threaded hole in alignment with the third open aperture, where the third adjustment screw passes through the third open aperture and thread engages the third threaded hole, and a second hinge arm extending perpendicularly from the base.

14. The hinge assembly of claim 13, wherein the distal end of the first hinge arm defines a hole, and the distal end of the second hinge arm defines a hole, where a shaft is positioned through the holes at the ends of the first and second hinge arms hingedly connecting the first and second hinge members.

15. The hinge assembly of claim 13, wherein the first hinge member is mounted to the first mounting plate and the second hinge member is mounted to the second mounting plate by one of bolts and mounting posts disposed on the first mounting plate and nuts.

16. A method for installing and adjusting a tailgate on an automobile, comprising the steps of:
   providing the hinge assembly of claim 1;
   mounting the first mounting plate to a body of the automobile; and
   mounting the second mounting plate to the tailgate.

17. The method of the claim 16, further comprising the step of adjusting the position of the tailgate on the automobile by using the first, second, and third adjustment screws.

18. The method of claim 16, wherein the mounting steps is/are accomplished by using adhesive, welding, and/or fasteners.

19. A vehicle tailgate assembly, comprising:
   a tailgate;
   a first mounting plate mounted to a body of an automobile;
   a first hinge member attached to the first mounting plate;
   a second mounting plate mounted to the tailgate;
   a second hinge member attached to the second mounting plate and hingedly connected to the first hinge member;
   a first adjustment screw coupling the first hinge member to the first mounting plate and adapted to adjust the position of the first hinge member on the first mounting plate in the x-direction;
   a second adjustment screw coupling the first hinge member to the first mounting plate and adapted to adjust the position of the first hinge member on the first mounting plate in the y-direction; and
   a third adjustment screw coupling the second hinge member to the second mounting plate and adapted to adjust the position of the second hinge member on the second mounting plate in the z-direction,
   wherein the x and y-directions are in a plane parallel to the first mounting plate, and the x, y, and z-directions are approximately orthogonal to each other when the hinge assembly is in a closed configuration.

20. The tailgate assembly of claim 19, wherein
the first mounting plate comprises:
   a flat, planar body including a mounting means for the first hinge member,
   a first adjustment tab extending perpendicularly away from the planar body and defining a first open aperture, where the first open aperture has a center axis in the x-direction and a major axis in the y-direction, and
   a second adjustment tab extending perpendicularly away from the planar body and defining a second open aperture, where the second open aperture has a center axis in the y-direction and a major axis in the x-direction;
wherein the first hinge member comprises:
   a first base mounted to the first mounting plate,
   a first hinge arm extending perpendicularly from the base, the first hinge arm defining a first threaded hole in alignment with the first open aperture, where the first adjustment screw passes through the first open aperture and thread engages the first threaded hole, and
   a wall extending perpendicularly from the base and defining a second threaded hole in alignment with the second open aperture, where the second adjustment screw passes through the second open aperture and thread engages the second threaded hole,
wherein the second mounting plate comprises:
   a flat, planar body including a mounting means for the second hinge member, and
   a third adjustment tab extending perpendicularly away from the planar body and defining a third open aperture, the third open aperture having a center axis in the z-direction,
wherein the second hinge member comprises:
   a second base mounted to the second mounting plate, the second base defining a third threaded hole in alignment with the third open aperture, where the third adjustment screw passes through the third open aperture and thread engages the third threaded hole, and
   a second hinge arm extending perpendicularly from the base.

* * * * *